Patented July 7, 1925.

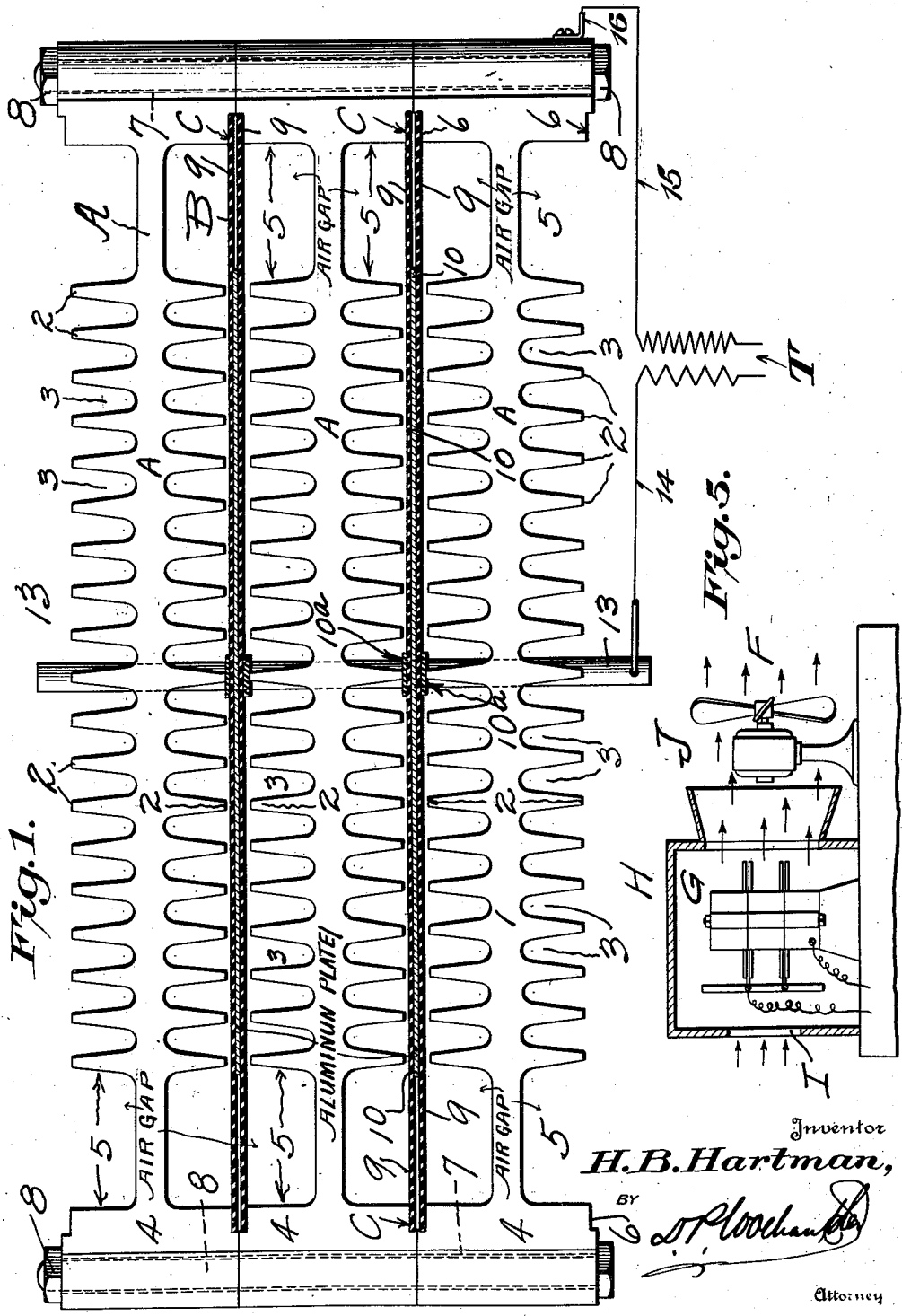

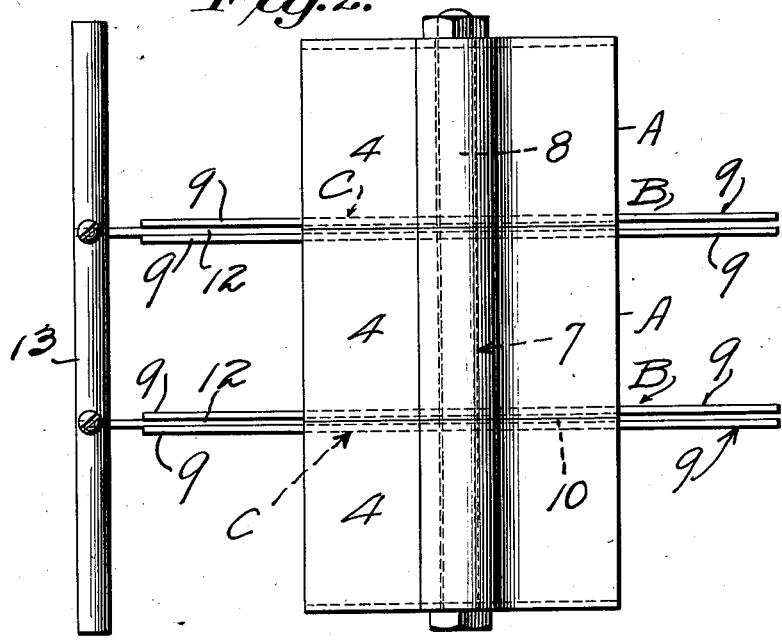
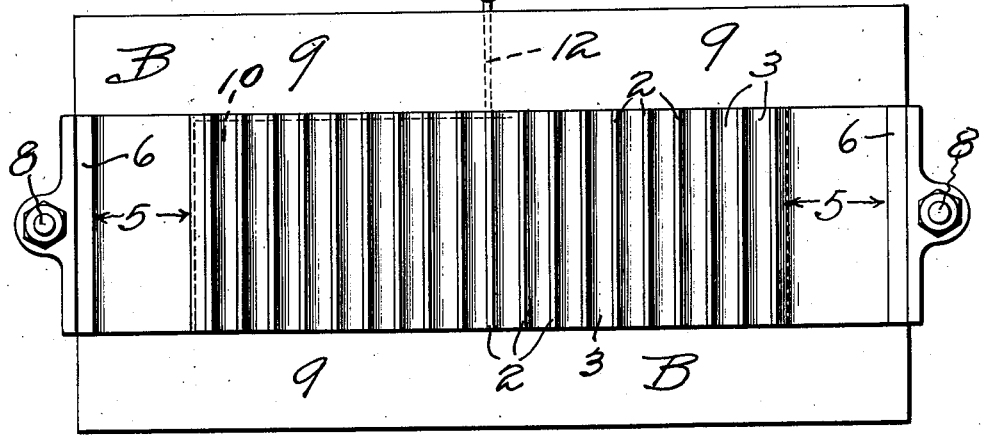

1,544,838

UNITED STATES PATENT OFFICE.

HARRY BUXTON HARTMAN, OF SCOTTDALE, PENNSYLVANIA, ASSIGNOR TO ELECTRIC WATER STERILIZER & OZONE COMPANY, OF SCOTTDALE, PENNSYLVANIA, A CORPORATION OF PENNSYLVANIA.

OZONE GENERATOR.

Application filed August 25, 1923. Serial No. 659,409.

*To all whom it may concern:*

Be it known that I, HARRY B. HARTMAN, citizen of the United States, residing at Scottdale, in the county of Westmoreland and State of Pennsylvania, have invented certain new and useful Improvements in Ozone Generators, of which the following is a specification.

This invention relates to ozone generators and has particular reference to a new type for generating ozone in the open air as distinguished from apparatus in which the generating plates are confined in an enveloping or closely surrounding casing which may be air or water cooled.

To that end the invention contemplates a construction designed particularly for purifying air and which may be readily built-up by properly assembling a plurality of sections or units, and which, because of the relatively open and substantially cell-like construction of the individual units, provides a completed structure having the general characteristics of a honey-comb, and therefore it has been conveniently designated as the "honey-comb" type.

Another object of the invention is to provide a novel electrode section which permits of readily carrying out the object of providing a generator of any desired capacity by simply assembling the castings in proper spaced relation and securing them in position.

A further object of the invention is to provide a simple, practical and reliable construction which is economical to manufacture and easily assembled and installed.

With the above and other objects in view which will more readily appear as the nature of the invention is better understood, the same consists in the novel construction, combination and arrangement of parts hereinafter more fully described, illustrated and claimed.

A preferred and practical embodiment of the present invention is shown in the accompanying drawings, in which:—

Figure 1 is a side elevation of a generator built-up in accordance with the present invention.

Figure 2 is an end elevation of the construction shown in Fig. 1.

Figure 3 is a top plan view of the construction shown in Figs. 1 and 2.

Figure 4 is a reduced detail plan view of the aluminum plate of the generating unit.

Figure 5 is a diagrammatic view illustrating the application of the invention.

Similar reference characters designate corresponding parts throughout the several figures of the drawings.

In carrying the present invention into effect it is proposed to provide a novel electrode unit having features of construction which permit of its duplication to provide a standardized unit or section which may be readily and conveniently assembled to provide a metallic frame-work for a generator of pre-determined size and capacity. That is to say, it is proposed to provide an aluminum electrode section A having novel structural characteristics which permits of its use in multiple in connection with a generating unit B to provide a multiplicity of generating points for producing ozone in a relatively unconfined space. By the construction herein proposed a point-to-plate discharge is obtained rather than a plate-to-plate discharge, and because of the facility with which the units may be multiplied it will be apparent that the number of generating points may be readily increased or diminished as desired.

Referring now more particularly to the electrode sections A it will be observed that the same essentially comprise a body portion 1 which is fluted cross-wise to provide the transverse ribs 2 and intervening channels 3, the said ribs 2 terminating short of the end posts 4 to provide the enlarged air gaps 5 at the ends of each section. The opposite inner edge portions of the end post 4 may be rabbeted or recessed as indicated as 6 and are also provided with the openings 7. Thus, when the sections A are superposed one upon the other the recess 6 of one unit will register with the recess 6 of the complemental unit to provide a channel C for removably receiving the generating unit B, and also the openings 7 will register to receive the assembling bolts 8.

The generating unit B preferably consists of the dielectric plates 9—9 which may be of mica or other suitable insulating material, and as shown in Figure 3 these plates are relatively wide as compared with the sections A and project beyond the opposite sides thereof as also clearly shown in Fig. 2.

Between the dielectric plates 9—9 is arranged an aluminum generating plate 10 which is of substantially the same width as the sections A and of a length equal only to substantially the extent of ribs on the section A as clearly shown in Fig. 1 of the drawings. Thus, the aluminum plate 10 terminates at each end in the space designated as the air gap 5 and has the valuable advantage of preserving the end of the plate 10 by obviating the intensity of the brush discharge from an edge and also prevents the jumping of sparks from the plate to the ends 4 of the sections A. The feature of the air gap is fully described and claimed in my Patent No. 1,436,251 dated November 21, 1922, which although showing plate forms of generators, nevertheless utilizes the desirable feature of the insulating air gap.

With reference to the aluminum generating plate 10 it may be observed that one edge thereof is cut or slit as indicated at 11 to provide an integral offset prong 12, which prong constitutes the connection to the terminal post 13. This post is connected as indicated at 14 in Fig. 1 to the transformer T, the said transformer being in turn connected to one of the electrode sections A by wire 15 and terminal 16.

In order to adequately support and space the intermediate portion of the generating unit B from the ribs or points 2, relatively narrow bakelite spacer strips 10$^a$ are inserted between the middle ribs of the sections A and thereby the mica dielectric sheets 9—9 are properly spaced throughout their length from the ribs 2 to provide the space between the ribs and the plates necessary for establishing the brush discharge which generates the ozone.

From the foregoing it will be apparent that the aluminum electrode sections A may be readily stacked one upon the other, and by reason of the registration of the recesses 6 there is provided a convenient channel or groove which permits of the ready insertion or removal of the generating unit B between each pair of sections. If for any reason the efficiency of the generating unit B is impaired, the terminal prong 12 or aluminum plate thereof may be readily disconnected from the terminal post 13 and the entire unit withdrawn from the channel C and quickly replaced. Also by reason of the fact that the end posts 4 are provided with the bolt receiving openings 7 which register when one unit is stacked upon the other, any desired number of units may be incorporated into a single structure to provide an ozone generator of the desired capacity by simply using connecting bolts of the proper length.

Figure 5 of the invention illustrates one way in which the device may be used after it has been set up in accordance with the preceding description. That is to say, the generator designated generally as G may be placed in a cabinet or housing H having a relatively capacious interior chamber and also having a relatively capacious intake opening I and outlet opening J which may be provided at one side thereof with a fan F for inducing a draft of air through the cabinet and throwing the ozone manufactured by the generator out into the room. As ozone in concentrated form is deleterious to the tissues of the human respiratory organs it is of course desirable that the ozone for purifying air be generated in a relatively unconfined space and it will of course be understood that the cabinet or housing H is simply intended to illustrate one convenient means for mixing air and ozone and distributing the ozonized air by means of a conventional electric fan. The apparatus may be used under some conditions equally well by simply having a fan disposed at one side thereof and without the casing but the object in using the capacious casing is to better control the direction of distribution of ozone by means of the fan or blower F.

Without further description is is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An ozone generator including a plate generating unit and an electrode having brush discharge points out of contact with and adjacent to said unit.

2. An ozone generator comprising a plurality of alternately arranged electrode sections and generating units, said sections having a plurality of brush discharge points.

3. An ozone generator of the honey-comb type comprising a plurality of electrode sections adapted to be stacked one upon the other, and a generating unit arranged between said sections.

4. An ozone generator of the honey-comb type comprising a plurality of electrode sections each comprising a body having ribs at one side thereof adapted to cooperate with the ribs of an adjoining section to provide a complete electrode for one generator unit, and a generating unit including the other electrode arranged between and spaced from said ribs of the sectional electrodes.

5. An ozone generator of the honey-comb type comprising a plurality of electrode sections provided with transverse ribs and an air gap at opposite ends of the ribs, a generating unit consisting of dielectric plates and an intermediate electrode plate arranged between the ribs of a pair of adjacent sections.

6. An ozone generator comprising complemental electrode sections having offset brush discharge points on adjacent faces, and a generating unit arranged between and spaced from said brush discharging points.

7. An ozone generator comprising complemental electrode sections having offset brush discharge points on adjacent faces, and also having complemental recesses providing grooves, and an ozone generating unit detachably fitted into said grooves and spaced from said brush discharge points.

8. An ozone generator comprising complemental electrode sections having offset brush discharge points on adjacent faces, and also having complemental recesses providing grooves, and an ozone generating unit detachably fitted into said grooves, said generator including a pair of insulating plates adapted to fit into said grooves, and an electrode plate arranged between said insulated plates.

9. An ozone generator comprising complemental electrode sections having offset brush discharge points on adjacent faces, and also having complemental recesses providing grooves, and an ozone generating unit detachably fitted into said grooves, said generating unit including a pair of insulating plates of greater width than the electrode sections and slidably fitted in the grooves thereof, and an electrode plate arranged between said insulating plates and being substantially co-extensive with the brush discharging points of the electrode sections.

10. In an ozone generator of the class described, an electrode section comprising a body having a plurality of brush discharge points at its medial portion and assembling end posts spaced from said brush discharge points to provide an insulating air gap, and a generating unit for cooperating with said section.

11. In an ozone generator of the class described, an electrode section including a body provided with a plurality of transverse ribs and assembling end posts spaced from said ribs to provide an insulating air gap between the ribs and the post, and a generating unit cooperating with said section.

12. In an ozone generator of the class described, an electrode section comprising a body having the opposite sides thereof formed with a plurality of ribs in intervening channels and also having the ends thereof spaced from the ribs to provide insulating air gaps at each side of the section, said body being also provided in the end post with bolt receiving openings and also provided at the inner edges with recesses, and a generating unit adapted to lie in certain of said recesses and cooperate with said sections.

13. In an ozone generator, a plurality of electrode sections having fluted bodies to provide a plurality of brush discharge points, assembling bolts for uniting all of said electrode sections, and generating units removably fitted between said sections.

14. In an ozone generator, a plurality of electrode sections having fluted bodies to provide a plurality of brush discharge points, and also having insulating gaps at the opposite ends of said fluted body, assembling bolts for holding the sections in operative relation, and generating units removably fitted between said sections and comprising insulating plates extending entirely between the inner edges of the sections and spanning the air gap, and an electrode plate arranged between said insulating plates and terminating at a point between the insulating plates within the zone of the air gap.

15. An ozone generator of the class described, the electrode sections, and a generating unit between said sections, said generating units including insulating plates of greater width than the sections and an electrode plate arranged between said insulating plates and of approximately the same width as said sections and carrying therewith a terminal element.

16. An ozone generator of the class described, the electrode sections having brush discharge points, a generating unit arranged between said sections and including insulating plates of greater width than said sections, a generating plate arranged between said insulating plates and being of substantially the same width as said sections and of a length corresponding to the brush discharge points, and an integral terminal element carried by said insulating plate.

17. An ozone generator of the class described including a plurality of electrode sections adapted to be arranged in stacked relation, bolts for holding said sections in assembled order, a terminal carried by one of the sections, and generating units removably fitted between said sections and including a generating plate having a terminal projecting therefrom, and a terminal plate common to all of the plates of the generating unit.

In testimony whereof I hereunto affix my signature in the presence of two witnesses.

HARRY BUXTON HARTMAN.

Witnesses:
ELLA ROTTLER,
HARRIET WILLEY.